US006434579B1

(12) United States Patent
Shaffer et al.

(10) Patent No.: US 6,434,579 B1
(45) Date of Patent: *Aug. 13, 2002

(54) SYSTEM AND METHOD OF CONSTRUCTING A PHOTO ALBUM

(75) Inventors: Stephen L. Shaffer, Penfield; John K. Mcbride; John R. Squilla, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/136,395

(22) Filed: Aug. 19, 1998

(51) Int. Cl.⁷ .............................................. G06F 15/00
(52) U.S. Cl. ........................................ 707/520; 283/67
(58) Field of Search ............................... 707/519, 520, 707/515, 104, 500.1, 501.1; 283/67

(56) References Cited

U.S. PATENT DOCUMENTS

| | | | |
|---|---|---|---|
| 4,888,648 A | 12/1989 | Takeuchi et al. ............ 358/335 |
| 5,041,921 A | 8/1991 | Scheffler ...................... 360/13 |
| 5,126,779 A | 6/1992 | Maitani ....................... 354/442 |
| 5,128,525 A | 7/1992 | Stearns et al. .............. 235/454 |
| 5,246,519 A | 9/1993 | McCormick ................. 156/247 |
| 5,285,438 A | 2/1994 | Marchand et al. .......... 369/103 |
| 5,403,138 A | 4/1995 | Otake et al. ................... 412/1 |
| 5,418,654 A | 5/1995 | Scheffler ...................... 360/13 |
| 5,440,401 A | * | 8/1995 | Parulski et al. ............. 386/124 |
| 5,454,678 A | 10/1995 | Hefty ............................. 412/1 |
| 5,524,932 A | 6/1996 | Kalisher ...................... 283/67 |
| 5,634,667 A | * | 6/1997 | Jordan ......................... 281/29 |
| 5,636,292 A | 6/1997 | Rhoads ....................... 382/232 |
| 5,636,957 A | 6/1997 | Hefty ............................. 412/1 |
| 5,784,461 A | 7/1998 | Shaffer et al. ................ 380/21 |
| 5,859,920 A | * | 1/1999 | Daly et al. ................... 382/115 |
| 5,934,777 A | * | 8/1999 | Patton et al. .................. 353/25 |
| 5,936,709 A | * | 8/1999 | Yamamoto ................... 355/40 |
| 6,017,157 A | * | 1/2000 | Garfinkle et al. ........... 396/639 |
| 6,035,323 A | * | 3/2000 | Narayen et al. ............ 709/201 |
| 6,123,362 A | * | 9/2000 | Squilla et al. ................ 283/67 |

OTHER PUBLICATIONS

U.S. application No. 08/565,804, Daly et al., filed Nov. 30, 1995.
"Photonet" from PictureVision. From Internet http://www.photonet.com, Jul. 16, 1998.
"Picture It" from Microsoft. From Internet http://www.wn.com/au/gol/computers/software-scene/PicIt.htm, Jul. 16, 1998.
"Creative Photo Albums" from DogByte Development. From Internet http://www.jacksonville.com/tu-online/stories/041998/bus_TECH_sof.html, Apr. 19, 1998.

* cited by examiner

Primary Examiner—Heather R. Herndon
Assistant Examiner—Maikhanh Nguyen
(74) Attorney, Agent, or Firm—Peyton C. Watkins

(57) ABSTRACT

A method of constructing a photo album including the steps of: providing a plurality of digital images; generating an sticker sheet of reduced resolution images from the digital images, the sticker sheet including a machine readable means for selecting one or more of images represented by the thumbnails to be included in the photo album; selecting one or more of the thumbnail images on the sticker sheet; reading the selected thumbnails from the sticker sheet with a scanner; and constructing a photo album from the digital images represented by the selected reduced resolution images

21 Claims, 7 Drawing Sheets

SYSTEM AND METHOD OF CONSTRUCTING A PHOTO ALBUM

CROSS-REFERENCE TO RELATED APPLICATIONS

The present application is related to U.S. application Ser. No. 09/178,696, filed Oct. 26, 1998, by John R. Squilla et al., and entitled, "System and Method Of Constructing A Photo Collage; now issued as U.S. Pat. No. 6,123,362 on Sep. 26, 2000".

FIELD OF THE INVENTION

The invention relates generally to the field of photography, and in particular to photo collections. More specifically, the invention relates to a method of generating a photo album using reduced resolution sticker versions of a customer's photographs.

BACKGROUND OF THE INVENTION

Photographs, videos, and memorabilia collections are common means for maintaining a memory of events and people over a lifetime. These collections serve to augment the human memory and enrich the process of sharing the stories related to the artifacts. Collections of photos and memorabilia are considered one of the most important and valued possessions by most people. They are the first things that people think of when forced to flee their homes due to fire, flood or other natural disaster. These collections possess intrinsic, emotional value, even if they are never viewed, because the need to preserve a memory of life is strong and universal. When organized, viewed and shared on a regular basis a collection of memory artifacts generates a large reward, enriching the lives of all involved. The nature of these collections is that they grow steadily, event by event, year by year, and soon become large and difficult to manage. The most common means of organizing collections of photos, videos or memorabilia is to use an album or box. Common vinyl album pages provide the means to store and view between one and five standard sized photos per page. Creative people often spend hours carefully selecting and arranging photos, writing captions, clipping newspaper articles, and other memorabilia to create visual stories or scrapbooks. Once organized into groups or pages these photocollages greatly enhance a person's ability to remember and share the story surrounding the depicted events. As used herein photocollage refers to a single page having a plurality of images, such as a page in a photo album, or a composite image having a number of images relating to a single theme such as a vacation, wedding, birthday party or the like. The concept of photocollage as used herein also includes the concept of a bound photo album having a plurality of pages, one or more of which is a photocollage. These simple organization tools allow the collections to be easily viewed and also serves to protect the artifacts themselves. There are numerous types of albums and boxes available in the market today, ranging from simple vinyl sleeves to boxes manufactured from specialized materials designed to preserve the artifacts. Album vendors include Pioneer Photo Albums, Design Vinyl and Cason-Talens. Box vendors include Exposures.

Despite the fact that many people are engaged in the collection of these memory artifacts few people invest the time necessary on a regular basis to organize and maintain them. Before long, the amount of unorganized material becomes a significant psychological barrier to getting organized. Other barriers exist which prevent people from actively maintaining these memorabilia collections such as confidence in their process, access to the materials, or remembering the details about the event. Often, once people get started on this organization task they find it rewarding and fun, but still a significant amount of work.

Many attempts have been made to provide tools for working with or organizing photo and memorabilia collections. Computer software programs such as Picture-It™, by Microsoft, or Creative Photo Albums™, by Dog Byte Development, allow people to work with digital versions of their photos and create digital versions of an album or print them on a home printer. Software products such as these require each photo or artifact exist in digital form before they can be used. Although these products increase the ability to change and enhance photos and scanned memorabilia they do not reduce the amount of work needed to organize collections or create visual stories. Other services such as Photo-Net™ by Picture Vision™ will scan photographs in a high-quality format at the time of photo processing and provide a thumbnail image of the scanned images via the Internet. A customer, using these scanned images can create collections of photos which can be viewed on the Internet or have prints generated. Currently these services do not allow for the arrangement of several photos on a page and are limited to consumers who have a computer connected to the Internet and who are both computer and web literate.

It should be apparent from the foregoing discussion that there remains a need within the art for a method by which consumers can create photocollages and photo albums in a manner that is as simple as ordering prints.

SUMMARY OF THE INVENTION

Other prior art disclosures have taught the use of thumbnail sketches that are reduced resolution versions of images requiring less storage space than the full resolution versions. The present invention addresses the foregoing discussed shortcomings in the prior art by creating a sticker sheet having a unique identifier so that a stored digital version of the image can be quickly accessed from a file. Accordingly, the present invention addresses the need for an improved method of generating photo albums from consumer photographs that requires a minimum amount of effort but yields a high-quality product and is reasonably priced.

The present invention is directed to overcoming one or more of the problems set forth above. Briefly summarized, according to one aspect of the present invention, a method of constructing a photo album includes the steps of providing a plurality of images; generating a sticker sheet of reduced resolution images from the full resolution digital images, the sticker sheet including a machine readable means for identifying the high resolution images to be included in the photo album represented by the reduced resolution stickers; selecting one or more of the reduced resolution images on the sticker sheet; placing the reduced resolution stickers onto a page layout sheet which indicates size of the image on the page, number of images per page, and textual additions, reading the selected reduced resolution images on the page layout sheet with a scanner; and constructing a photo album, or a photocollage from the digital images represented by the selected reduced resolution images and layout sheets.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages: Allows the user to have (1) an easy method of choosing photos and laying them out on pages for creating professional looking photocollages, (2) duplication of photocollages, and (3) keeping photocollage files for later use.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
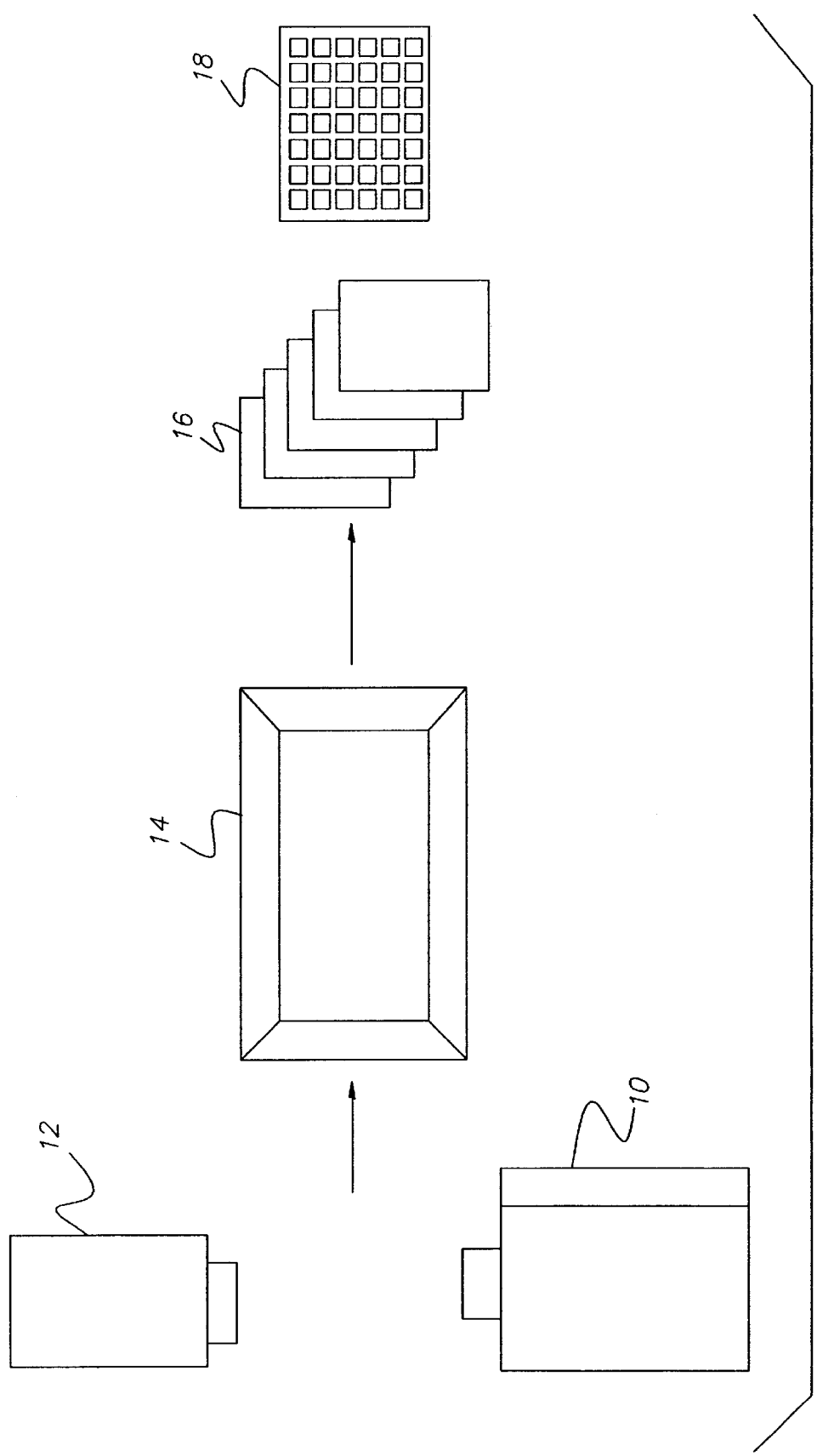
FIG. 1 is a block diagram showing the basic system elements to generate the sticker sheet useful for practicing the present invention.

We have discovered that a photo album or photocollage can be created in a simple and effective manner by supplying a reduced resolution sticker version of the developed pictures and a simple page/album ordering system. Referring to FIG. 1, a consumer sends their roll of exposed film 10 or Digital Still Camera memory cards 12 to a photofinisher 14, and the customer receives a set of prints 16 and a sticker sheet 18 that is to be used as a photocollage creation tool. The sticker sheet 18 has a reduced resolution version of each of the photographs from the roll 10 or the memory card 12.

Figure 2:
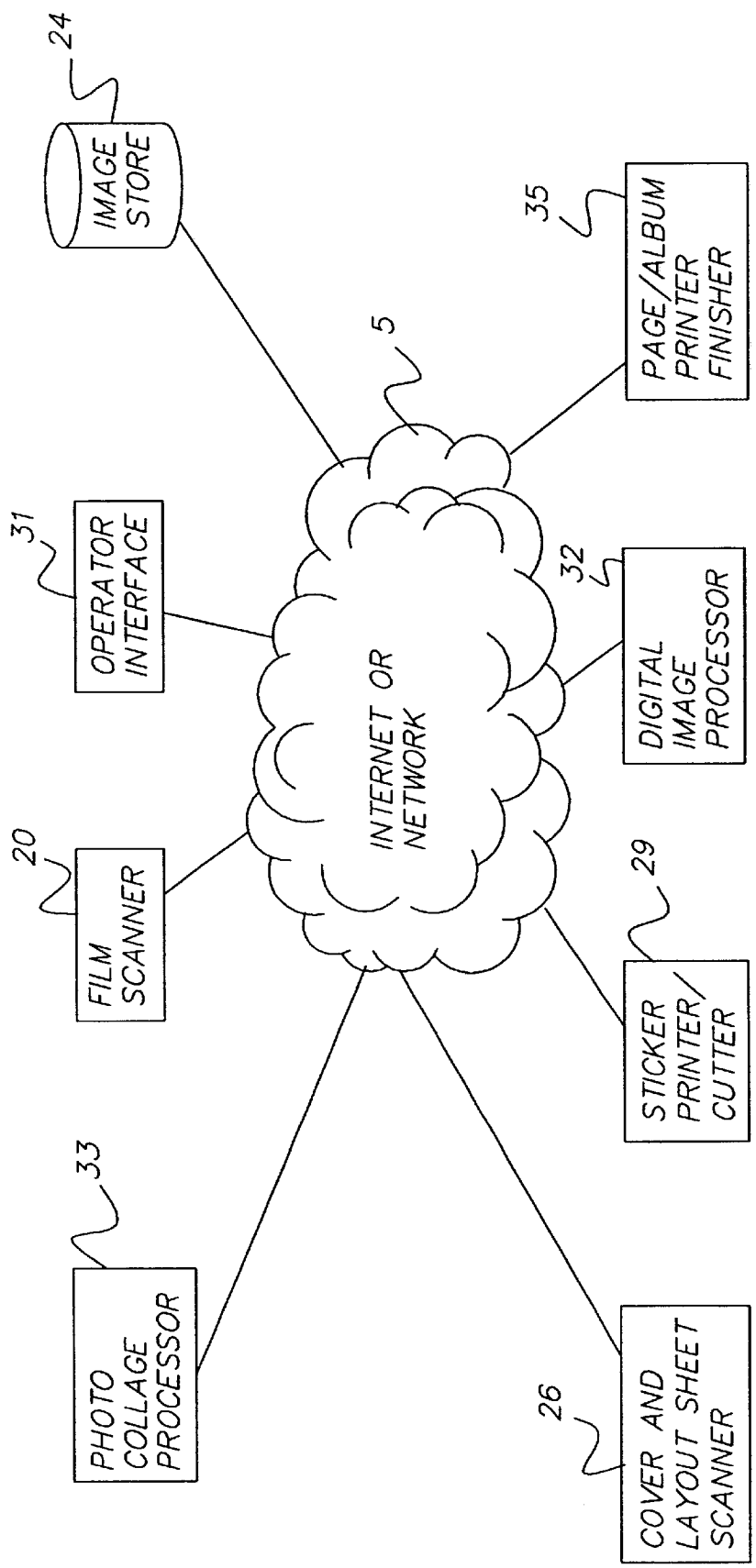
FIG. 2 is a system diagram showing a digital image processing system envisioned by the present invention.

Referring to FIG. 2, which is the system as envisioned by the present invention, viewed in conjunction with FIG. 1, conventional film processing takes place with potential correction of exposed photographs via operator interface 31. Operator intervention typically takes place once exposed photographs are seen as having incorrect brightness or color content. A preferred system will have, in addition to the printing apparatus typically employed by a photofinisher, a film scanner 20. At the photofinisher 14, exposed film images are chemically processed to generate an optical image. These optical images are then scanned using the digital film scanner 20 to produce a high resolution digital file that is archived in an image store 24. In general, to produce a high resolution printed image of 8×10 inch size a resolution of 1538×1024 pixels is required. The Digital Still Camera images from Digital Still Camera memory cards 12 are digitally processed to produce an equivalent digital image file of similar size. Once in usable digital form, both the film captured images and the Digital Camera captured images are then processed using a low-pass frequency filter and spatial sub-sampling to generate a reduced resolution version of the image. This processing technique is similar to that shown in the FlashPix toolkit on the Eastman Kodak World Wide Web site (www.kodak.com). These reduced resolution images are used to form a sticker sheet 29 and printed on a adhesive backed media.

The original high-resolution images are archived in image storage 24 for future use. This archive of digital images would, in most cases, comprise a software database application and a large collection of optical or magnetic storage media. In order to allow for the future association of the high-resolution images with their corresponding reduced resolution thumbnail images, each image is assigned a unique identifier. There are a variety of means, known in the art, for the generation of this unique identification. One such means is disclosed in Townsend and Shaffer, U.S. Pat. No. 5,784,461, in which a combination of the customer identification information and the photofinishing location, equipment, and date and time are combined. Other means of unique identification could be employed so long as they provide a one-to-one association of a person to a single image. The assigned unique image identification is associated with both the high and reduced resolution versions of the image. The unique identifier embodiment can be any of either: embedded data contained within the pixels themselves, invisible ink, visible codes, histogram, color information, or the like. The reduced resolution images are further processed to generate a formatted array or sticker sheet 18.

Figure 3:
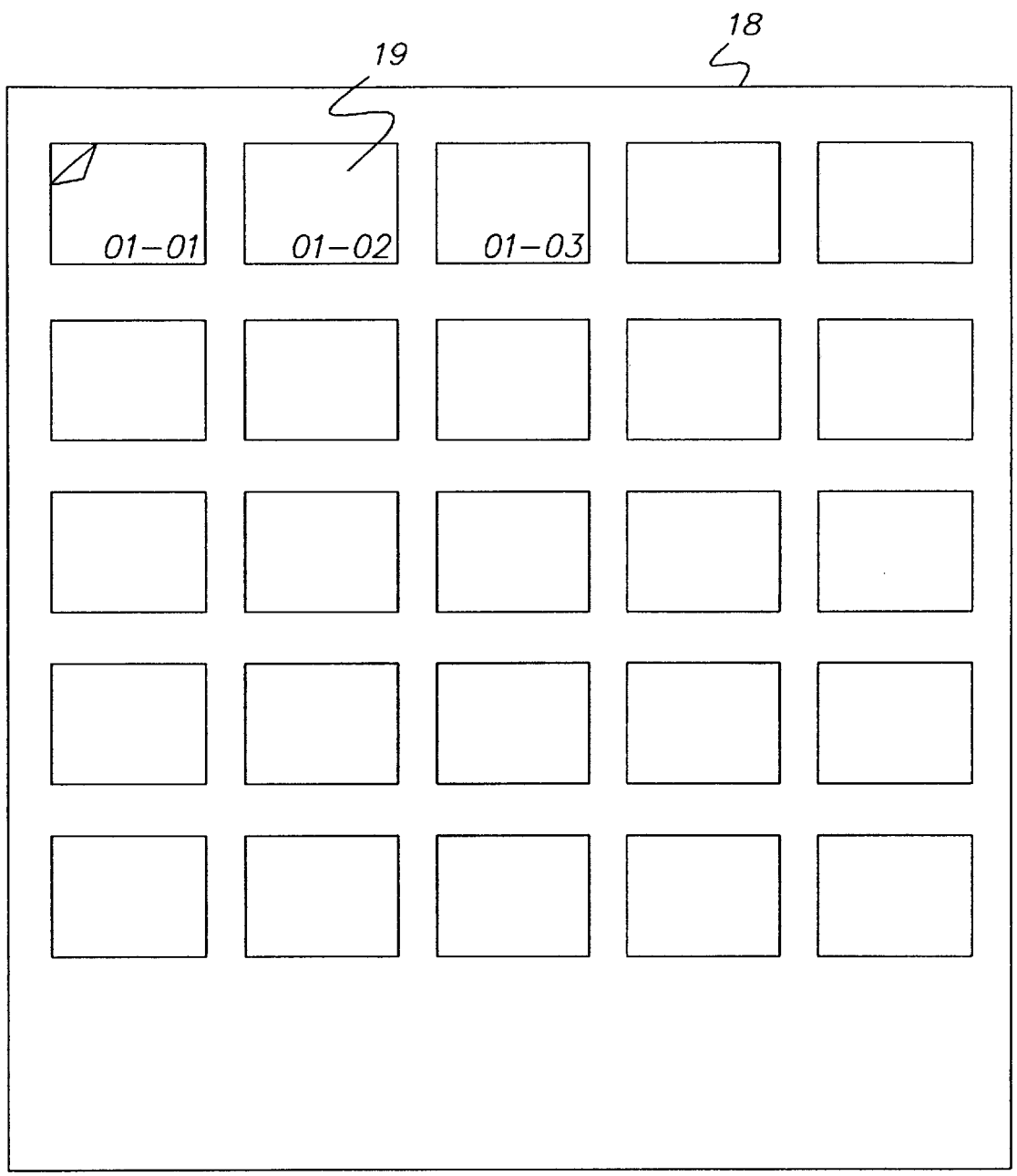
FIG. 3 is a schematic diagram showing an sticker sheet of reduced resolution images to be used with the present invention.

Referring to FIG. 3, the sticker sheet 18 also includes an alpha numeric human readable image identifier 19 which allows the user to locate the corresponding photographic print of the sticker sheet image. In addition a unique machine-readable image identification is also included in the printed sticker sheet. The machine readable image identification could take the form of a bar code, machine readable characters or any one of a number of data-encoding patterns. A preferred implementation this unique machine readable image identification is to embed it directly into the pixels of the thumbnail image using signal processing techniques. An example of such techniques can be seen in Daly et al. (U.S. Pat. No. 5,859,920 issued on Jan. 12, 1999).

The method of embedding digital data in an image can be best considered in two stages; an encoding process and a decoding process. First, a multi-level data image is generated from digital data. The multi-level data image as described in detail below is an image having a constant background value and an array of spots on the background representing the digital data. The data image may be produced using digital image processing techniques, or may be produced optically for example by exposing spots on a photographic film. Next, the data image is convolved with an encoding carrier image to form a frequency dispersed data image. The encoding carrier image is preferably a rotationally symmetric, low amplitude, high frequency pattern employed to spatially disperse the data image to mask its visibility when added to the source image. Preferably the convolution is performed on a digital computer using a well known Fourier Transform method and digital versions of the data image and the encoding carrier image. The convolution may also be performed using a direct convolution algorithm on the digital computer. Alternatively, the convolution may be performed optically using well known optical convolution techniques and optical versions of the data image and the encoding carrier image. The frequency dispersed data image is then added to the source image to form a source image with embedded data. As described in more detail below, the addition may be performed either optically using traditional photographic processes, or digitally using a digital computer and digital versions of the source image and the frequency dispersed data image. If the addition is performed digitally, a hard copy version of the digital source image having embedded data may be produced using a digital printer such as a thermal, ink-jet, electrophotographic, or silver halide printer.

The digital data is recovered from the source image having embedded data by first cross correlating the source image having embedded data with a decoding carrier image to produce a recovered data image. Preferably, the decoding carrier image is identical to the encoding carrier image and the cross correlation is performed by a digital computer on digital versions of the source image having embedded data and the decoding carrier image. If a hard copy of the source image having embedded data is used, the hard copy is first scanned as described in detail below to produce a digital version. Alternatively, the cross correlation may be performed using well known optical techniques and optical versions of the source image having embedded data and the decoding carrier image. Finally, the digital data is extracted from the recovered data image. Preferably, the digital data is extracted from a digital version of the recovered data image using a pattern recognition process in a digital computer. Alternative methods for encoding data within an image can be found in issued U.S. Pat. Nos. 5,636,292; 5,128,525; 5,285,438; and 5,126,779 which can also be used with the present invention.

Figure 4:
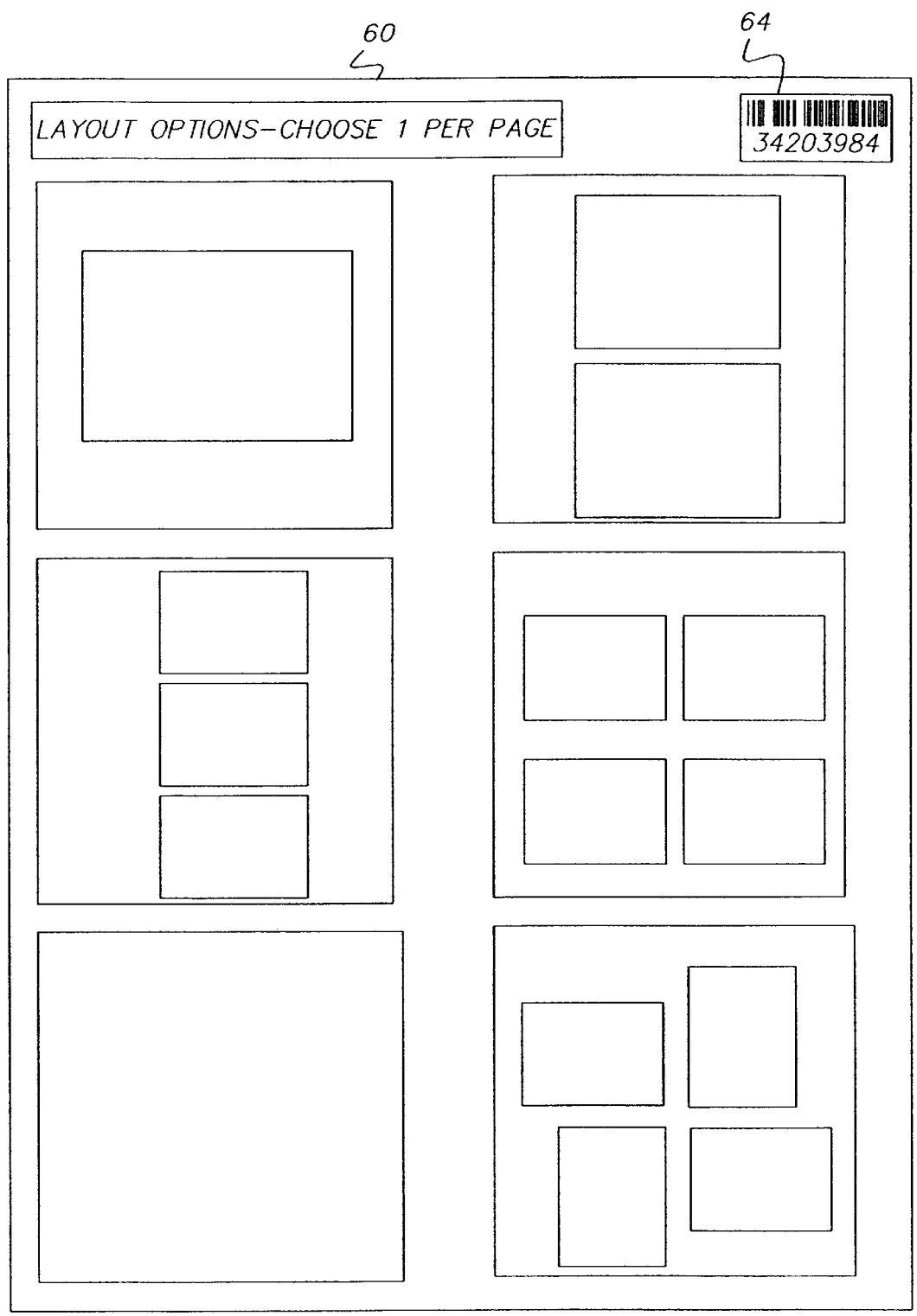
FIG. 4 is a drawing showing some of the layout styles available for a page in a photocollage.
Figure 5:
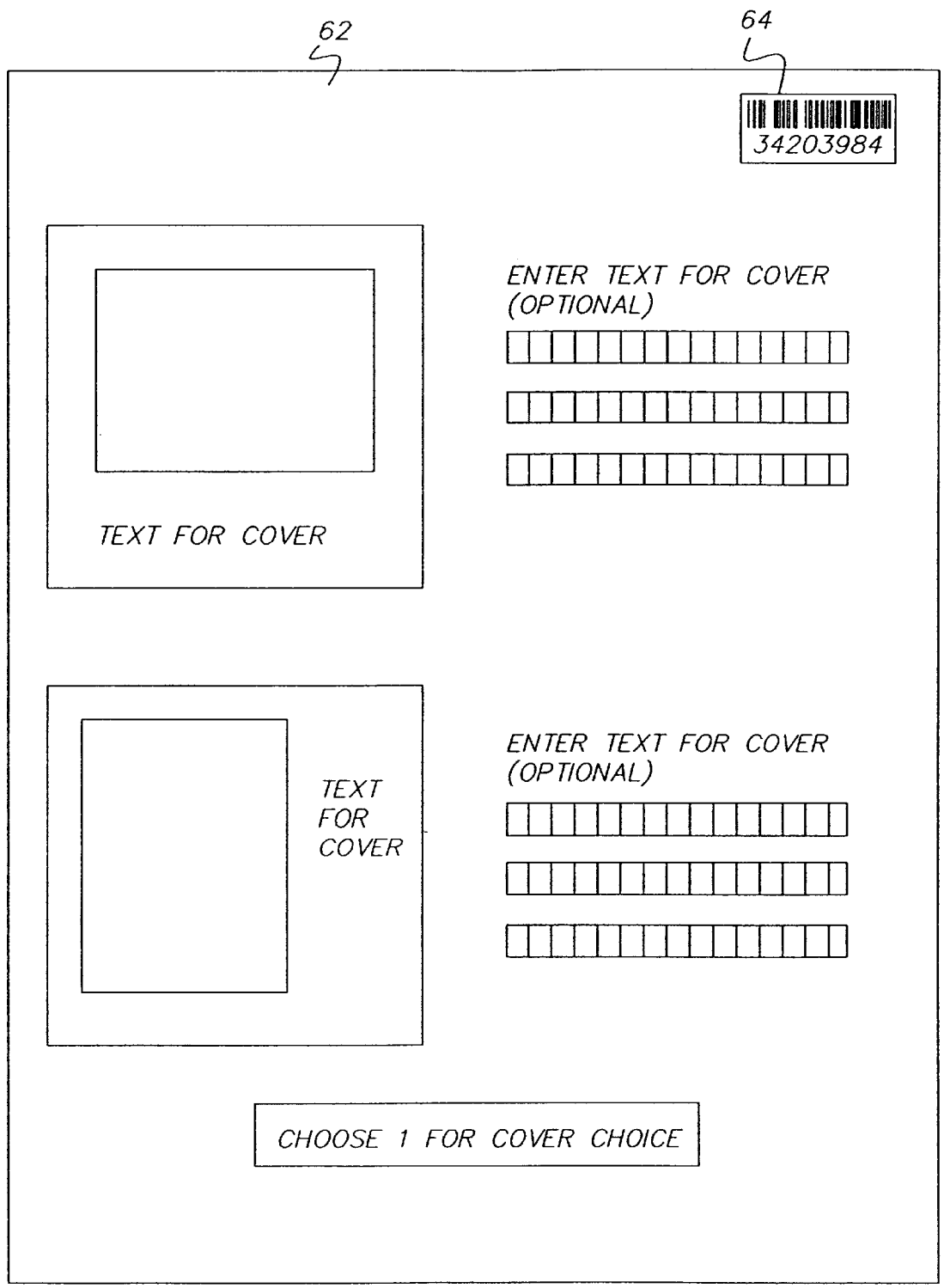
FIG. 5 is a drawing showing the layout of a title page for the album or photocollage.

A customer wishing to construct a photocollage selects one or more images by peeling the sticker image from the sticker sheet 18 and placing it on the page layout form 60 as shown in FIG. 4. The page layout form 60 includes one or more scaled graphic depictions of the final page each comprising a unique page layout. In one embodiment each scaled page representation includes one or more graphic image boxes each of which is an allowable location to place a sticker. Different scale page layout representations depict the available album page layouts made available by the service. Normally this variety of page layout choices would include variety along the dimensions of: the number of images per page, the resulting size of the images on the final printed page, arrangements accommodating both portrait (vertical) and landscape (horizontal) captured original images, different final printed page sizes, provision for annotation text, different size original images including standard 35mm, Advanced Photo System classic, HDTV and Panoramic images and, Digital Still Camera formats. Special page layouts would also be provided for cover pages 62 as shown in FIG. 5. The scale of the sticker images and the scale of the graphic image boxes on the page layout order form do not have to be the same. If the page layout form image box is larger than the sticker image the image is enlarged to fill the box when producing the final printed album page. If the page layout form image box is smaller than the sticker image the image is reduced to fill the box when producing the final printed album page. In this way a variety of final output sized images can be made available to the user without the need to produce multiple sizes of sticker images. The page layout sheet and cover sheet would have identifiers 64 on them so that the page type can be identified during the scanning process. Bar code or alphanumeric characters can be used for this identification.

Once the selection has been made the consumer sends the completed page layout form(s) 60 and 62 to the photofinisher to have the photocollage prepared. The method of communicating the selection of the thumbnails on an sticker sheet further comprise the provision of electronic communication means for transmitting the contents of the sticker sheet including: a touch-tone phone, a facsimile transmission, or a touchpad connected to a computer.

The photocollage is created when the customer sends in the page layout and cover sheets with the stickers attached representing the desired images for the photocollage. The roll information, and the images to be used in the photocollage are identified by scanning the layout 60 and cover sheet and 62 using the cover and layout sheet scanner 26. Information about orders such as customer name, quantity, etc., are entered into the system via the operator interface 31.

Figure 7:
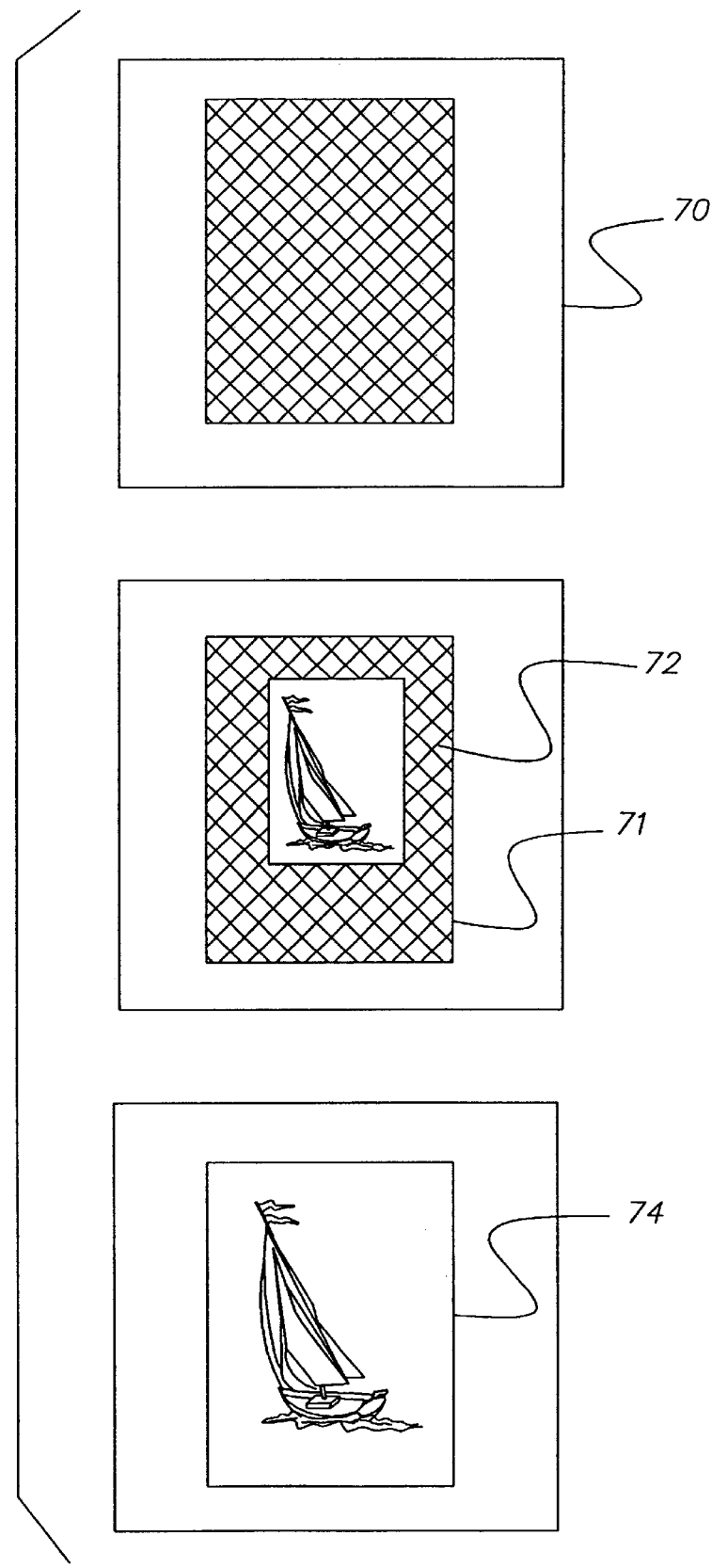
FIG. 7 is a diagram showing how using a sticker results in a larger image in the final product.

Using the generated list of images the photocollage processor 33 finds and retrieves the corresponding high resolution images that were previously stored in the image storage 24 which are associated with the unique image identification numbers that were supplied by the scanned layout sheets 60 and 62. These high-resolution images are then assembled into a photocollage using a page description language or template following graphical rules. These graphical rules incorporate customer preferences such as size of the pages, background styles and colors, etc. In this page layout process it may be necessary to zoom and crop the images to optimize the layout or to match customer preferences. FIG. 7 shows an example of this process. The sample layout 70 is filled with a sticker of the users choice 72. When the photocollage order is processed, the full resolution image represented by the sticker 72 is resized to fill the space represented by the image border 71 on the layout sheet 70. The photocollage pages are then assembled and rendered by the digital image processor 32 and printed via the page/album printer-finisher 35.

FIG. 2 illustrates the preferred embodiment of the present invention wherein each of the components has an interface to a common network 5. Certain components will exist at the photofinishers such as the sticker sheet printer/cutter 29, the film scanner 20. Other subsets of the system would exist at multiple locations such as having a print shop with the page/album printer finisher 35 and a remote processing site providing services for the digital image processor 32.

Figure 6:
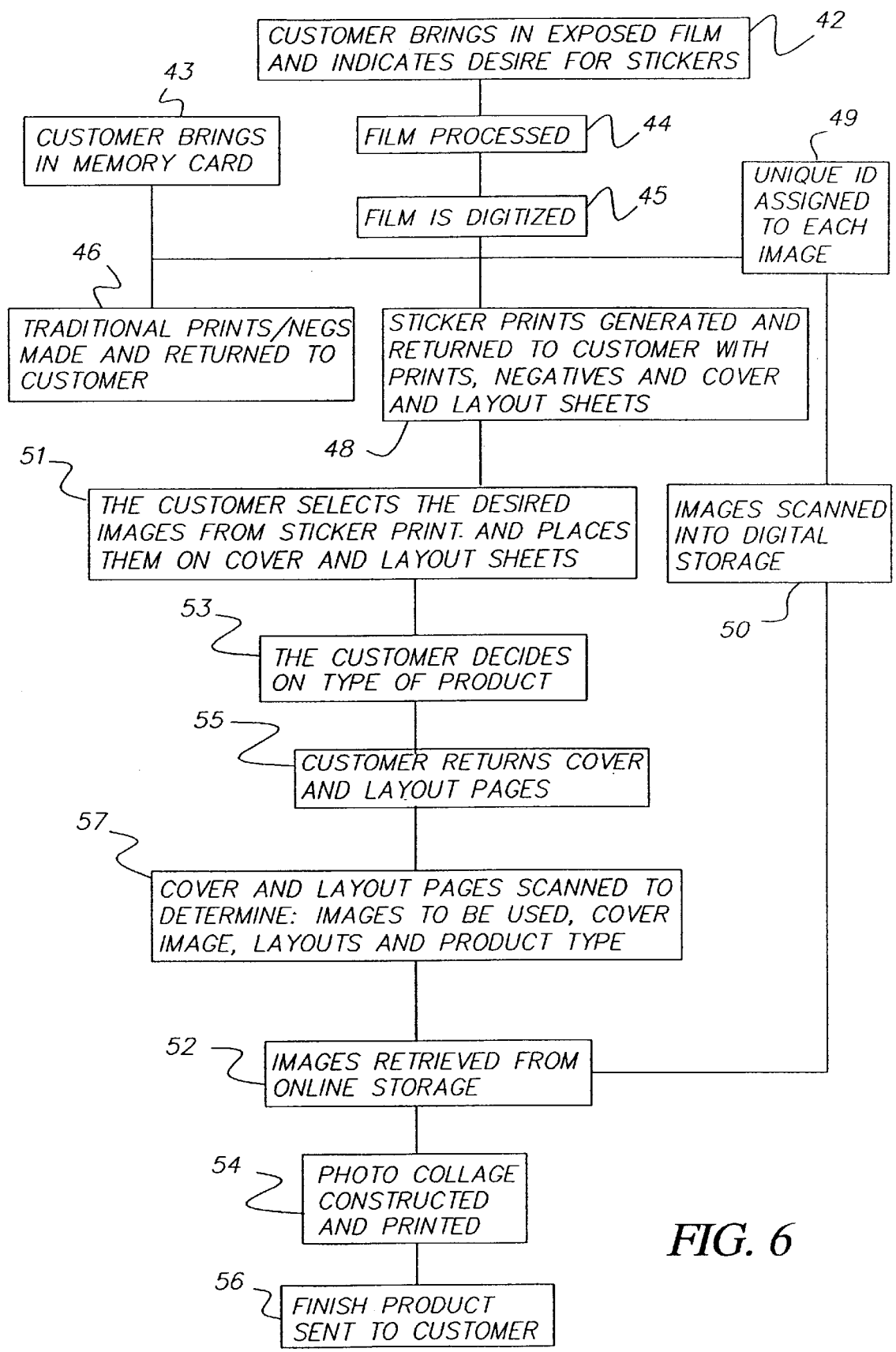
FIG. 6 is a flow chart showing the steps performed in the method of the present invention.

Referring to FIG. 6, which illustrates the process steps that are performed from developing photographs to generation of photocollages. The customer brings in exposed film 42 or a memory card from a digital camera 43 containing images that are to be made into a photocollage. The photofinisher generates traditional prints 46 for the customer. In the case of film, the film is scanned 45 to create a digital image. Once acquired, the digital images are assigned a unique ID 49 and placed into digital storage 50. A sticker sheet 18 is generated 48 which is sent to customer for selection of images to be used in the photocollage. The sticker sheet 18 and the layout pages 60 and 62 can be sent to the customer along with their prints. The customer selects the desired images from the sticker sheet 18 places them on the page layout sheet and cover sheet 60 and 62 as they wish 51. They would also select the type of product 53 from a standard order form supplied with sticker sheet 18. The customer then returns the cover and layout sheet 60 and 62 to the retailer 55 where the sheets are scanned with the cover and layout sheet scanner 26 to create a photocollage order. The photocollage order is processed to determine which images are to be used in the photocollage, the cover, the layout and the product type 57. The unique identifiers from the reduced resolution images are then associated with the images stored in the online storage facility and these full scale images are retrieved 52. The photocollage is then constructed and printed 54 and sent to the customer 56.

Depending upon the method employed for rendering the image identification number within the sticker sheet a variety of image processing techniques would be employed. In the case of human readable image identification numbers optical character recognition software is employed that translates the scanned image of the characters to a digital number representation. In the case where the image identification was hidden within the pixels of the reduced resolution image, a reverse of the data embedding signal processing technique is employed. The images are processed to remove any rotation and scale variations introduced in the printing and scanning steps. The result of this processing is to generate a list of the identification numbers of the images which the customer desires to have placed into the photocollage.

Additional stickers can be provided representing stock images from, theme parks, national monuments and other popular topics that can be incorporated within the photocollage via the layout sheets. This allows the customer to use professional content to augment the appearance and value of the photocollages. High resolution representations of these additional content stickers would also have to be contained within an image database and would require unique identifiers similar to the personal images.

The invention has been described with reference to a preferred embodiment. However, it will be appreciated that variations and modifications can be effected by a person of ordinary skill in the art without departing from the scope of the invention.

PARTS LIST 5 internet or network
10 exposed film
12 memory cards
14 photofinisher
16 prints
18 sticker sheets
19 numeric identifier on stickers
20 film scanner
24 image storage
26 sticker sheet scanner
29 sticker printer/cutter
31 operator interface
32 digital image processor
33 photocollage processor
34 box
35 printer finisher
42 exposed film
43 digital camera
44 film processed
45 film digitization
46 prints returned
48 materials for photocollages returned to customer
49 unique id
50 digital storage
51 image selection and placement
52 high resolution mage retrieval
53 product decision
54 photocollage printing
55 return of materials
56 finished product sent out
57 layouts scanned
60 page layout sheet
62 cover layout sheet
64 identifier for page layout sheet or cover sheet
70 sample layout page
71 image border
72 sticker placed on sample layout page
74 resultant page in photocollage

What is claimed is:

1. A method of constructing a photocollage, comprising:
    a) providing a plurality of high resolution digital images;
    b) storing the high resolution digital images;
    c) generating an index sticker sheet having a plurality of stickers, each of the stickers comprising a reduced resolution thumbnail representing one of the high resolution digital images and means for uniquely identifying the sticker with the high resolution digital image that is associated with that reduced resolution image;
    d) providing at least one page layout form for manually attaching the stickers to configure a photocollage representation;
    e) assembling the photocollage representation by manually attaching the individual stickers to a hardcopy cover and hardcopy layout form;
    f) employing the means for uniquely associating stickers images with the stored high resolution digital image; and
    g) generating the photocollage from the stored high resolution digital images according to the photocollage representation.

2. The method of claim 1 further comprising the step of communicating information regarding the photocollage to a photofinisher.

3. The method of claim 2 wherein information communicated to the photofinisher is selected from one of the following: product order information, color choice, background selection, or billing information.

4. The method of constructing a photocollage claimed in claim 1 wherein the means for uniquely associating each of the stickers is a machine readable code.

5. The method of constructing a photocollage claimed in claim 1 wherein the steps of employing and generating are performed automatically.

6. The method claimed in claim 1, wherein the means for uniquely associating the images includes data embedded in the reduced resolution thumbnail.

7. The method claimed in claim 1, wherein the means for uniquely associating the images is a bar code.

8. The method claimed in claim 1, wherein the generated photocollage is stored as a digital data file.

9. A system for creating photocollages comprising:
    a) means for acquiring a high resolution digital version for each of a plurality of images;
    b) a storage medium that is operatively connected to the means for acquiring;
    c) means for creating a reduced resolution version from the high resolution digital version, the reduced resolution version having a unique identifier that associates the reduced resolution version with its high resolution counterpart;
    d) means for generating a sticker sheet containing a plurality of stickers, each of the stickers being representative of one of the reduced resolution and having the unique identifier associating that reduced resolution version with its respective high resolution version;
    e) a layout form for the stickers arranged such that a photocollage is created when the stickers are manually placed on the hardcopy layout form;
    f) means for reading the photocollage on the hardcopy layout form and acquiring the high resolution version of the images contained within the photocollage from the storage medium; and
    g) means for generating a high resolution photocollage from the acquired high resolution images.

10. The system of claim 9 wherein the means for reading further comprises means for reading the unique identifier on each of the stickers.

11. The system of claim 9 wherein the means for acquiring is a scanner.

12. The system of claim 9 wherein the means for generating a high resolution photocollage further comprises means for constructing the high resolution photocollage from the stored high resolution digital versions that are associated with the reduced resolution version that are contained in the layout form.

13. The system of claim 9 wherein the unique identifier is either a machine readable code or a human readable code.

14. The system of claim 9 wherein the means for associating the reduced resolution images with the stored digital image files is performed automatically.

15. The system of claim 9 wherein the unique identifier includes data embedded in the reduced resolution image.

16. The system of claim 9 wherein the unique identifier further comprises a bar code associated with the reduced resolution image.

17. The system of claim 9 further comprising electronic communication means for transmitting the photocollage representation.

18. The system of claim 17 wherein the communication means further comprises one of the following: a modem, a facsimile transmission, or a touch pad connected to a computer.

19. The system of claim 9 wherein the means for creating the unique identifier is selected from one of the following: embedded data, invisible ink, visible codes, histogram, or color information.

20. The system of claim 9 wherein the sticker sheet has the stickers arranged accordingly to a specific topic selected from one of the following: an event; a person; a location; or chronologically.

21. The system of claim 9 further comprising means for adding additional stickers to the sticker sheet comprised of images relevant to one of a plurality of events selected from a library of images.

* * * * *